United States Patent [19]

van Os

[11] Patent Number: 4,653,381
[45] Date of Patent: Mar. 31, 1987

[54] MOTOR SUSPENSION APPARATUS FOR HYDROMOTORS

[75] Inventor: Cornelis J. van Os, Emmen, Netherlands

[73] Assignee: Noord-Nederlandsche Machinefabriek B.V., Netherlands

[21] Appl. No.: 785,081

[22] Filed: Oct. 7, 1985

Related U.S. Application Data

[63] Continuation of Ser. No. 496,531, May 17, 1983, abandoned.

[30] Foreign Application Priority Data

May 21, 1982 [NL] Netherlands ............... 8202101

[51] Int. Cl.$^4$ ............................................. F01B 13/00
[52] U.S. Cl. ............................................. 91/61; 92/148
[58] Field of Search ............ 91/61; 92/146, 147, 92/161, 126, 135; 248/654, 550, DIG. 1, 562, 248/565, 636, 637, 638, 672; 267/15 A; 123/192 R; 180/300

[56] References Cited

U.S. PATENT DOCUMENTS

| | | | |
|---|---|---|---|
| 1,888,460 | 11/1932 | LaPointe | 123/192 R |
| 2,161,439 | 6/1939 | Thoma | 60/451 |
| 2,500,932 | 3/1950 | Curtis et al. | 248/654 X |
| 2,746,289 | 5/1956 | Cline | 73/117 |
| 2,876,925 | 3/1964 | Wall et al. | 220/18 |
| 3,037,574 | 6/1962 | Clerk | 180/3 DD X |
| 3,208,395 | 9/1965 | Budzich | 91/505 X |
| 3,495,508 | 2/1970 | Allen | 92/135 X |
| 3,664,681 | 5/1972 | Thaxton | 267/15 A |
| 4,364,540 | 12/1982 | Montabert | 248/654 |

FOREIGN PATENT DOCUMENTS

| | | | |
|---|---|---|---|
| 0003108 | 4/1979 | European Pat. Off. | |
| 2300054 | 7/1974 | Fed. Rep. of Germany | |
| 2851441 | 6/1979 | Fed. Rep. of Germany | |
| 2487740 | 2/1982 | France | 180/300 |

Primary Examiner—Edward K. Look
Attorney, Agent, or Firm—Irvin A. Lavine

[57] ABSTRACT

A motor suspension apparatus for a hydromotor of the radial-symmetrical type, characterized by an arm which, in operation, is substantially horizontal, and one end of which is adapted for attachment to the hydromotor and the other end of which is pivotally and fixedly supported in a vertical plane, while between the ends of the arm there is provided a supporting device exerting on the arm a vertical force proportional to the working pressure prevailing in the hydromotor.

4 Claims, 2 Drawing Figures

MOTOR SUSPENSION APPARATUS FOR HYDROMOTORS

This application is a continuation of application Ser. No. 496,531, filed May 17, 1983, now abandoned.

The invention relates to a motor suspension apparatus for a hydromotor of the radial-symmetrical type. Such a hydromotor is known e.g. from Dutch application No. 80.00115 and is suitable for being slid directly on a shaft to be driven. This can e.g. be effected by designing the shaft of the hydromotor itself as a hollow shaft with internal keyways and by making the shaft to be driven complementary, or by externally providing the hydromotor shaft with keyways adapted for coaction with complementary keyways in a hollow end of the shaft to be driven.

Such a method of coupling a hydromotor with a shaft to be driven, with the hydromotor so to say freely suspended from the shaft to be driven, is in particular advantageous if large torques have to be transmitted. For in such a coupling, interposed gearboxes, being very expensive and bulky if large torques have to be transmitted, are superfluous, while furthermore no alignment problems arise either.

A problem going with such a free suspension of a hydromotor is that the driven shaft is loaded not only by the weight of the motor but is also subjected to forces that are proportional to the torque delivered by the hydromotor. The latter forces can vary substantially in operation and result in a much heavier driven shaft being required than would be necessary if only the weight of the hydromotor should play a role.

Consequently, there is a need for an apparatus with which the effects of the reaction forces produced by the torque delivered can be compensated.

It is an object of the invention to provide for this need. To this effect according to the invention, a motor suspension apparatus for hydromotors is characterized by an arm which, in operation, is substantially horizontal and whose one end is adapted for attachment to the hydromotor and whose other end is pivotally and fixedly supported in a vertical plane, while between the ends of the arm there is provided a supporting device exerting on the arm a vertical force proportional to the working pressure prevailing in the hydromotor.

One embodiment of the apparatus according to the invention will now be described, by way of example, with reference to the accompanying drawings, in which:

FIG. 1 is an elevational view of an apparatus according to the invention. At 1 is diagrammatically shown a hydromotor having a shaft 2, which in this embodiment can rotate clockwise, as indicated with an arrow 3, and which is connectible e.g. by means of internal or external keyways, not shown, to a shaft to be driven.

Figure 1:
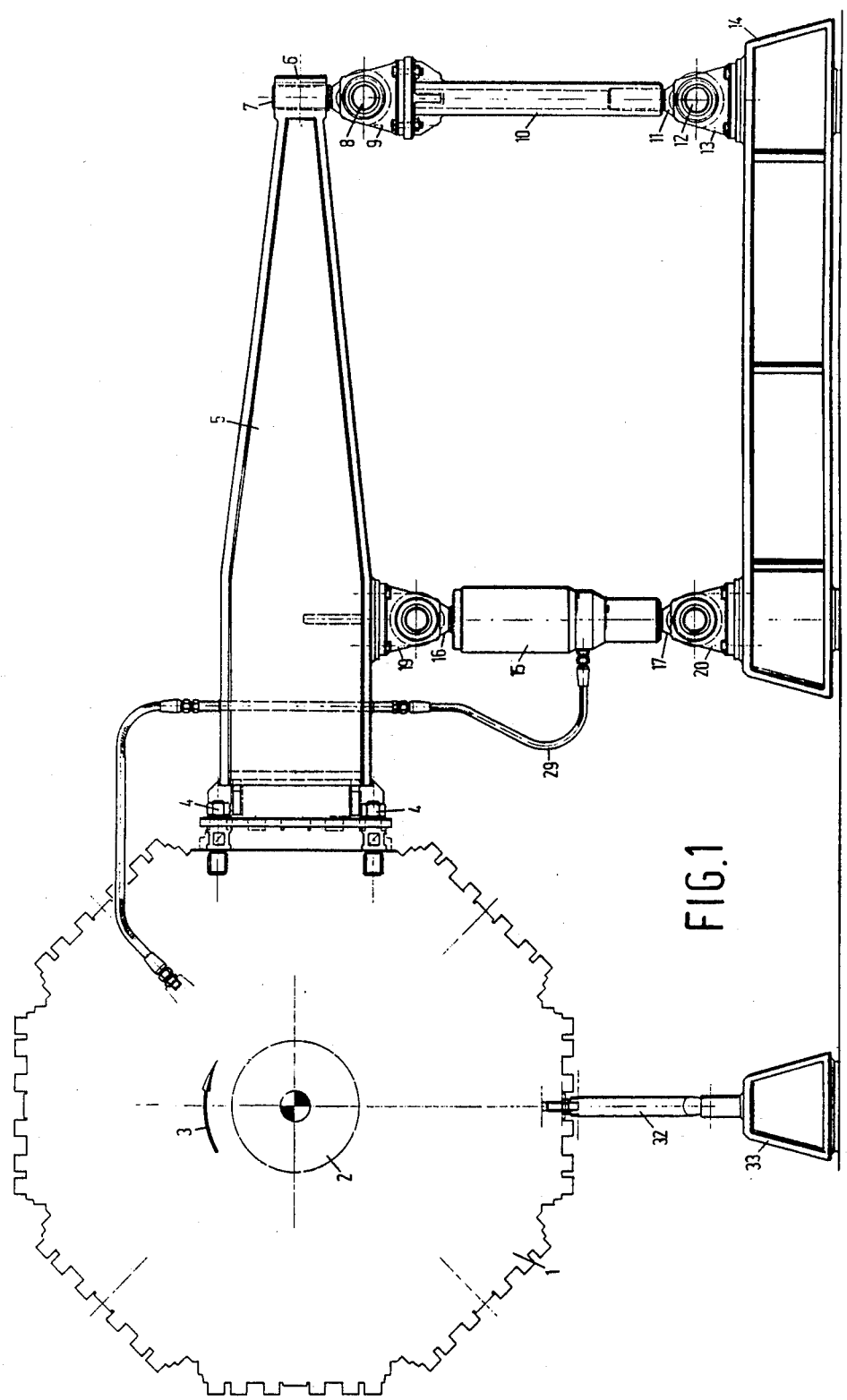
FIG. 1 is an elevational view of an embodiment of an apparatus according to the invention.

The housing of the hydromotor is connected by means of bolts and nuts 4 to a substantially horizontal arm 5 of a suspension apparatus. Said bolts and nuts 4 may advantageously be the cylinder head attachment bolts of one of the cylinders of the hydromotor, which attachment bolts are already present anyway.

The arm 5, in the embodiment shown, is tubular, having a substantially square cross-section, with the end remote from the hydromotor being slightly tapered and terminating in a vertically arranged threaded bush 6 wherein an eyebolt 7 is screwed. The eye of the eyebolt is oriented downwards and is attached between two vertical flanges 9 of a vertical rod or tube 10 for pivoting movement about a shaft 8. The tube or rod 10 provides a fixed point for the end of the arm 5 and carries part of the weight of the arm 5, but does not support the weight of the hydromotor. The tube or rod 10 is a link in tension.

In the lower end of the rod or tube 10 away from the arm 5 there is again screwed an eyebolt 11, which is attached between two vertical flanges 13 of a base 14 for pivoting movement about a shaft 12. The construction is so designed that pivoting of the rod 10 relative to the arm 5 and the base 14 is possible only in one and the same vertical plane containing the longitudinal axis of the arm 5 or being parallel thereto.

The perpendicular distance between the base 14 and the arm 5 can be accurately adjusted to the desired value by means of the eyebolts.

Figure 2:
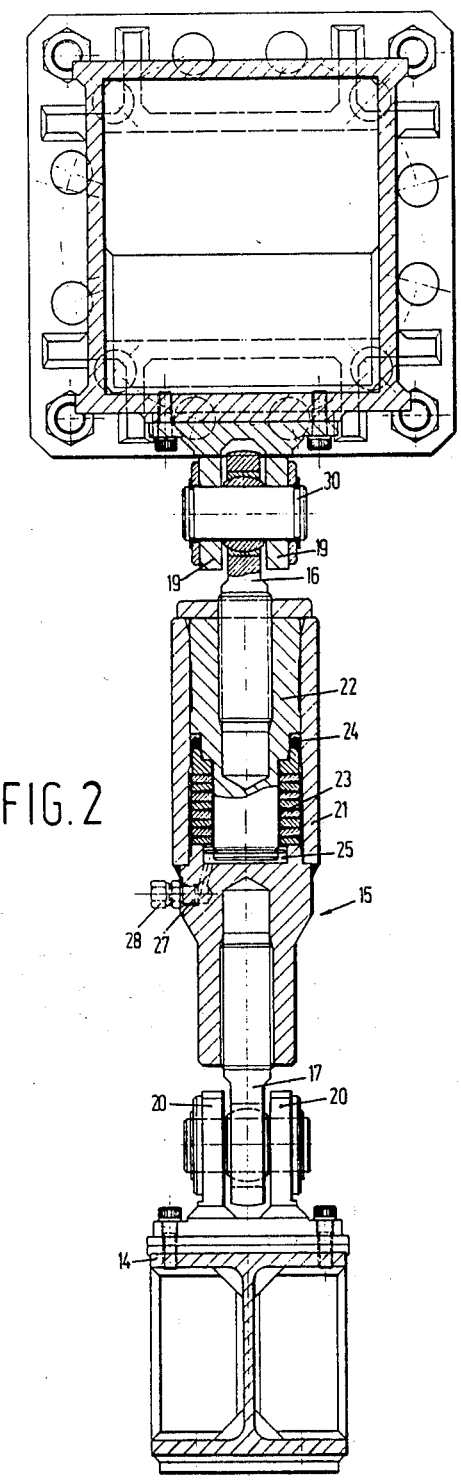
FIG. 2 is a cross-sectional view taken on the line II—II of FIG. 1.

Between the end of the arm 5 remote from the motor and the hydromotor, the arm is further supported by a device 15, which is shown in cross-section in FIG. 2. The device 15 is also supported on the base 14 and is fitted both at the top and at the bottom with eyebolts 16, 17, the eye portion of each being attached, similarly to the eyebolt 11, between pairs of flanges 19, 20, which in turn are attached to the arm 5 and the base 14, respectively. The position of the eyebolts and the flanges is chosen in such a manner that pivoting of the device 15 relative to the arm 5 and the base 14 is possible in the same plane as that in which the rod or tube 10 can pivot or in a plane parallel thereto. Should the arms 5 be very long and/or heavy, such that the weight of the part of the arm 5 extending beyond the device 15 would more than unbalance the dead weight of the hydromotor, the tube or rod 10 would be in compression. However, such a situation will probably never occur in practice.

The device 15 comprises further a housing 21 having the form of a cylinder barrel accommodating a piston body 22 at the end proximal to the arm 5. The uppper eyebolt 16 is screwed into the piston body.

The piston body rests on a packet of Belleville washers 23, serving to take up the weight of the hydromotor.

Furthermore, a gasket 24 is provided between the inner wall of the cylinder barrel and the piston body, while within the barrel, underneath the piston body, there is present a space 25 to which a pressure medium can be supplied.

To this effect, the space 25 communicates via a bore 26 with a port 27 wherein a connecting nipple 28 of a pressure line can be screwed. In operation, the port 27 is connected to a pressure line 29, which is preferably of a flexible type, with the other end of the pressure line 29 being connected to a point of the hydromotor or the lines coupled thereto, wherein the working pressure of the motor prevails. Since the working pressure in the motor is directly proportional to the torque delivered, the piston body exerts via the eyebolt 16, the pivot pin 30 inserted through the eyebolt and through the flanges 19, and the flanges 19 on the arm 5, which is connected to the motor, a force which is proportional to the torque delivered.

In this manner the motor is supported at all times in such a way that the influence of the (varying) torgue delivered is effectively compensated.

Figure 3:
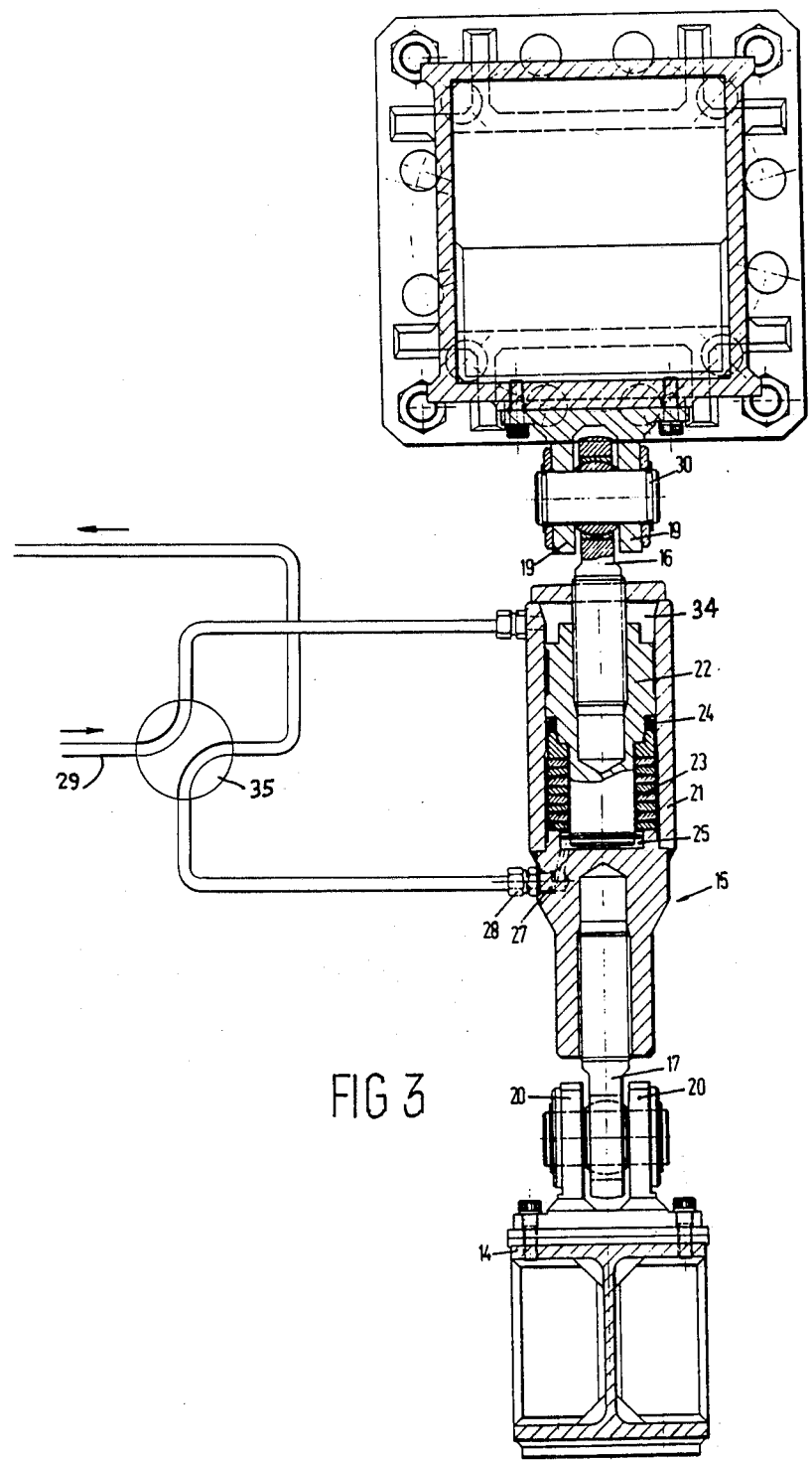
FIG. 3 is a cross-sectional view of an alternate embodiment.

The pressure line 29 is preferably attached to the arm 5 or, as shown in FIG. 1, partly passed through the arm 5, so that the chance of damage to the pressure line is minimized. Secured further to the motor is an arm 32, diagrammatically indicated, and serving for fixing the position of the motor on the driven shaft and which is secured to a fixed point, in the embodiment shown to a base 33 placed on the floor. The arm 32 has an inclined position in a plane transverse to the plane of drawing. The length of the arm 32 and its position are adjustable in a known manner. It is observed that the supporting construction in FIG. 1 is at the right hand side of the motor, since the motor in this embodiment turns clockwise. If the motor turns counterclockwise, the supporting construction should be at the left-hand side of the motor. When the motor, in a given arrangement, can both turn clockwise and counterclockwise, a single supporting construction according to the invention will yet be sufficient, provided the piston 22 is designed as a double-acting piston as shown in FIG. 3, and so that depending on the sense of rotation, a pressure medium with the working pressure of the motor can be supplied either underneath or above the piston. For this purpose, as shown in FIG. 3, a second space 34 can be located above the piston and the pressure line 29 can be branched, so that pressure line 29 is coupled both with space 25 underneath the piston and with space 34 above the piston. The working pressure of the hydromotor thus can be produced in space 34 above the piston through pressure line 29. A reversing valve 35 is provided at the branching location for supplying the pressure medium to one or the other of spaces 25 and 34, depending on the sense of rotation of the hydromotor.

It is further observed that various constructional modifications of the described apparatus are possible. For instance, in the embodiment shown, the base 14 is designed as a combined base, which carries both the rod or tube 10 and the device 15. However, it is also possible to use two loose base, which, if desired, can be interconnected through rods or the like. It is also possible to secure the flanges 13 and the like directly to the floor.

Such and other modifications are obvious to one skilled in the art and are deemed to fall within the scope of the invention.

I claim:

1. In combination with a hydromotor having a housing, a shaft, and bearings for said shaft, said hydromotor delivering a varying torque to said shaft and a reactive torque being applied to said housing, means for applying to said hydromotor housing a varying, compensating torque to the reactive torque, comprising:
   an arm having a first end attached to said housing, a second end disposed laterally of said housing and a longitudinal axis, said arm being substantially perpendicular to said shaft;
   means for supporting said arm at said second end for pivotal movement of said arm in a vertical plane containing said vertical axis of said arm; and
   means for applying to said arm intermediate said first and second ends a varying, compensating torque to the reactive torque, comprising a substantially vertical cylinder barrel, a piston disposed in said cylinder barrel, means disposed in said cylinder barrel below said piston for biasing said piston against the weight of said hydromotor, a space disposed underneath said piston in said cylinder barrel, a pressure conduit fluid connecting said space underneath said piston with a pressure proportional to the working pressure of said hydromotor, and means for connecting said piston to said arm for pivotal movement of said cylinder means relative to said arm in substantially the same plane as said arm.

2. The apparatus of claim 1, said pressure conduit having first and second ends, said first end being fluid connected to the working pressure of the hydromotor and said second end being fluid connected to said space underneath said piston.

3. In combination with a hydromotor having a housing, a shaft, and bearings for said shaft, said hydromotor delivering a varying torque to said shaft and a reactive torque being applied to said housing, means for applying to said hydromotor housing a varying, compensating torque to the reactive torque, comprising:
   an arm having a first end attached to said housing, a second end disposed laterally of said housing and a longitudinal axis, said arm being substantially perpendicular to said shaft;
   means for supporting said arm at said second end for pivotal movement of said arm in a vertical plane containing said vertical axis of said arm; and
   means for applying to said arm intermediate said first and second ends a varying, compensating torque to the reactive torque, comprising a substantially vertical cylinder barrel, a piston disposed in said cylinder barrel, means disposed in said cylinder barrel below said piston for biasing said piston against the weight of said hydromotor, a space disposed above said piston in said cylinder barrel, a pressure conduit fluid connecting said space above said piston with a pressure proportional to the working pressure of said hydromotor, a space disposed underneath said piston in said cylinder barrel, said pressure conduit also being fluid connected with said space underneath said piston, said pressure conduit including a reversing valve for supplying hydraulic pressure to one or the other of said spaces, depending on the direction of rotation of said hydromotor, and means for connecting said piston to said arm for pivotal movement of said cylinder means relative to said arm in substantially the same plane as said arm.

4. The apparatus of claim 3, said pressure conduit having first end and second ends, said first end being fluid connected to the working pressure of the hydromotor and said second end being fluid connected with said spaces above and underneath said piston.

* * * * *